US006256059B1

(12) United States Patent
Fichtner

(10) Patent No.: US 6,256,059 B1
(45) Date of Patent: *Jul. 3, 2001

(54) AUTOMATIC TRANSFER OF IMAGE INFORMATION BETWEEN IMAGING DEVICE AND HOST SYSTEM

(75) Inventor: Mark R. Fichtner, Chandler, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,732

(22) Filed: Jan. 7, 1999

(51) Int. Cl.$^7$ .............................. H04N 5/225; H04N 7/00
(52) U.S. Cl. ....................... 348/207; 348/222; 348/552; 710/8
(58) Field of Search .................... 348/13, 207, 211–213, 348/231–233, 552; 358/906, 909.1; 382/293, 295–299; 340/825.44; 395/700, 830; 710/8, 10; H04N 5/232

(56) References Cited

U.S. PATENT DOCUMENTS

| | | | | |
|---|---|---|---|---|
| 5,386,567 | * | 1/1995 | Lien | 395/700 |
| 5,404,494 | * | 4/1995 | Garney . | |
| 5,436,621 | * | 7/1995 | Macho | 340/825 |
| 5,475,441 | * | 12/1995 | Parulski et al. | 348/552 |
| 5,477,264 | * | 12/1995 | Sarbadhikari et al. | 348/231 |
| 5,506,617 | * | 4/1996 | Parulski | 348/207 |
| 5,534,921 | * | 7/1996 | Sawanobori | 348/333 |
| 5,568,192 | * | 10/1996 | Hannah | 348/222 |
| 5,608,490 | * | 3/1997 | Ogawa . | |
| 5,675,358 | * | 10/1997 | Bullock et al. | 345/115 |
| 5,710,895 | * | 1/1998 | Gerber . | |
| 5,781,798 | * | 7/1998 | Beatty | 395/830 |
| 5,861,918 | * | 1/1999 | Anderson et al. | 348/233 |

* cited by examiner

Primary Examiner—Wendy R. Garber
Assistant Examiner—Ngoc-Yen Vu
(74) Attorney, Agent, or Firm—Blakely, Sokoloff, Taylor & Zafman LLP

(57) ABSTRACT

Image information is transferred between an imaging device and a host system. The host system detects that an imaging device is connected to the host system. In response to detecting the imaging device, one or more images are transferred between the imaging device and the host system.

10 Claims, 6 Drawing Sheets

| OPERATING SYSTEM | HOST APPLICATION S/W | CAMERA API |
|---|---|---|
| Open Host Application S/W → | Create and Initialize CameraAPI →<br>→<br>→<br>→<br><br>Add main window to CameraAPI's callback list | Reset internal variables<br>Load O/S dependent DLLs<br>Create & start backgrd thread<br>Insert a CM_SIGNAL_STATUS message into backgrd-threaded queue |

FIG. 4

| CAMERA API | | HOST APPLICATION SOFTWARE |
|---|---|---|
| CM_SIGNAL_STATUS<br>If Camera is not Open<br>  If OpenDriver() succeeds<br>    Close Driver()<br>    If message has not been sent before<br>      Signal all callback windows | → | WM_CAMERAAPI_STATUS<br>If Message is CM_IS_CONNECTED<br>  OpenDriver() |
| CM_OPEN_DRIVER<br>Open camera driver<br>Check for compatible camera | ← | |
| CM_GET_NO_OF_IMAGES<br>Returns number of images on camera | ← | Get number of images |
| CM_GET_IMAGE_LIST<br>Returns list of image names and sizes | ← | If number of images > 0<br>  Get Image List |
| CM_GET_IMAGE_BY_NAME<br>Returns image with given name | ← | Download images, one-by-one |

FIG. 5

AUTOMATIC TRANSFER OF IMAGE INFORMATION BETWEEN IMAGING DEVICE AND HOST SYSTEM

FIELD OF THE INVENTION

The present invention relates to the field of imaging. More particularly, this invention relates to transferring image information between an imaging device and a host system.

BACKGROUND OF THE INVENTION

Imaging devices, such as cameras, typically store still or moving (video) image information on film, video tape, or other media. Digital cameras capture image information in digital format and store the image information in memory, such as a flash memory, or on other digital storage media. The digital image information can be downloaded to a host system, such as a personal computer. The image information can then be manipulated by rotating the image, cropping the image, or otherwise altering the image with software applications residing on the host system.

In order to process an image on a host system, a user attaches an imaging device to the host system, initiates application software for interfacing with the imaging device, and transfers image information between the imaging device and the host system. Each of these tasks can take several steps, and may be intimidating for a picture taker who has novice computer skills.

SUMMARY OF THE PRESENT INVENTION

A method of transferring image information between an imaging device and a host system is disclosed. The host system detects that an imaging device is connected to the host system. In response to detecting the imaging device, one or more images are transferred between the imaging device and the host system.

Other features, and advantages of the present invention will be apparent from the accompanying drawings and from the detailed description that follows below.

BRIEF DESCRIPTION OF THE DRAWINGS

FIG. 4 shows one embodiment of the polling initialization process.

FIG. 5 shows an embodiment of the polling process between the camera API 62 and the host applications software 60.

DETAILED DESCRIPTION

A method of transferring image information between an imaging device and a host system is disclosed. In one embodiment, the transferring of image information is performed automatically upon connecting the imaging device to the host system.

The imaging device may be an image capture device, such as a camera. Alternatively, the techniques disclosed can be used with any device that is capable of storing image information. The host system may be any system which is capable of manipulating image information. For example, the host system may be a personal computer such as an IBM-compatible personal computer running on an Intel Pentium® or Pentium® II processor. However, the host system could alternatively be a printer, plotter, fax machine, display device, or storage device.

Figure 1:
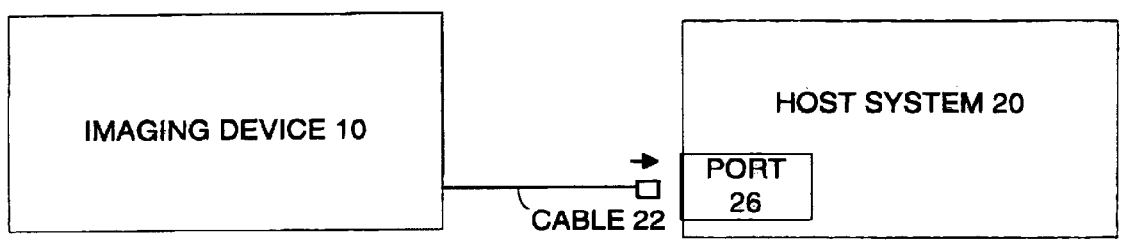
FIG. 1 shows a representation of an imaging device that is attachable to a host system.

FIG. 1 shows a representation of an imaging device 10 that is attachable to a host system 20. In one embodiment, the imaging device 10 is attached via a cable 22 to a port 26 of the host system 20. The imaging device 10 is preferably coupled to the host system 20 using a data transfer protocol that supports a high data transfer rate. In one embodiment, the imaging device 10 is coupled to the host system 20 via a Universal Serial Bus (USB) connection. The USB connection provides for a data transfer rate of up to 12 Mb/s. Other connections and data transfer protocols may alternatively be used, such as the 1394 protocol. (More information on USB can be obtained from the World Wide Web at the URL htt://www.usb.org/. The 1394 standard is maintained and distributed by the Institute of Electrical and Electronic Engineers. Firewire, one implementation of 1394, is defined by IEEE Standard 1394-1995.)

Figure 2:
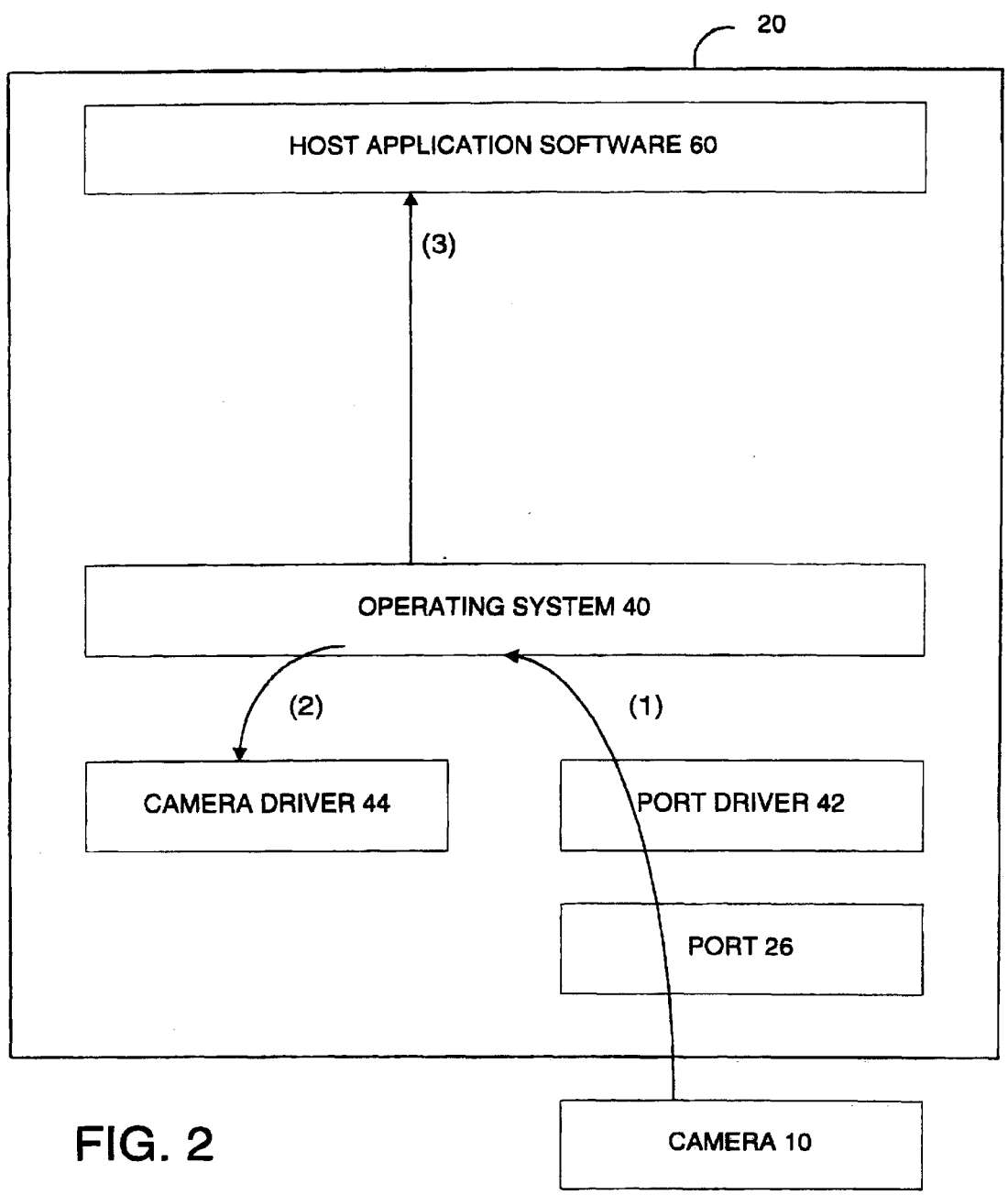
FIG. 2 shows one embodiment of the flow of information among the components of the host system when the imaging device 10 is first connected to the host system 20.
Figure 3:
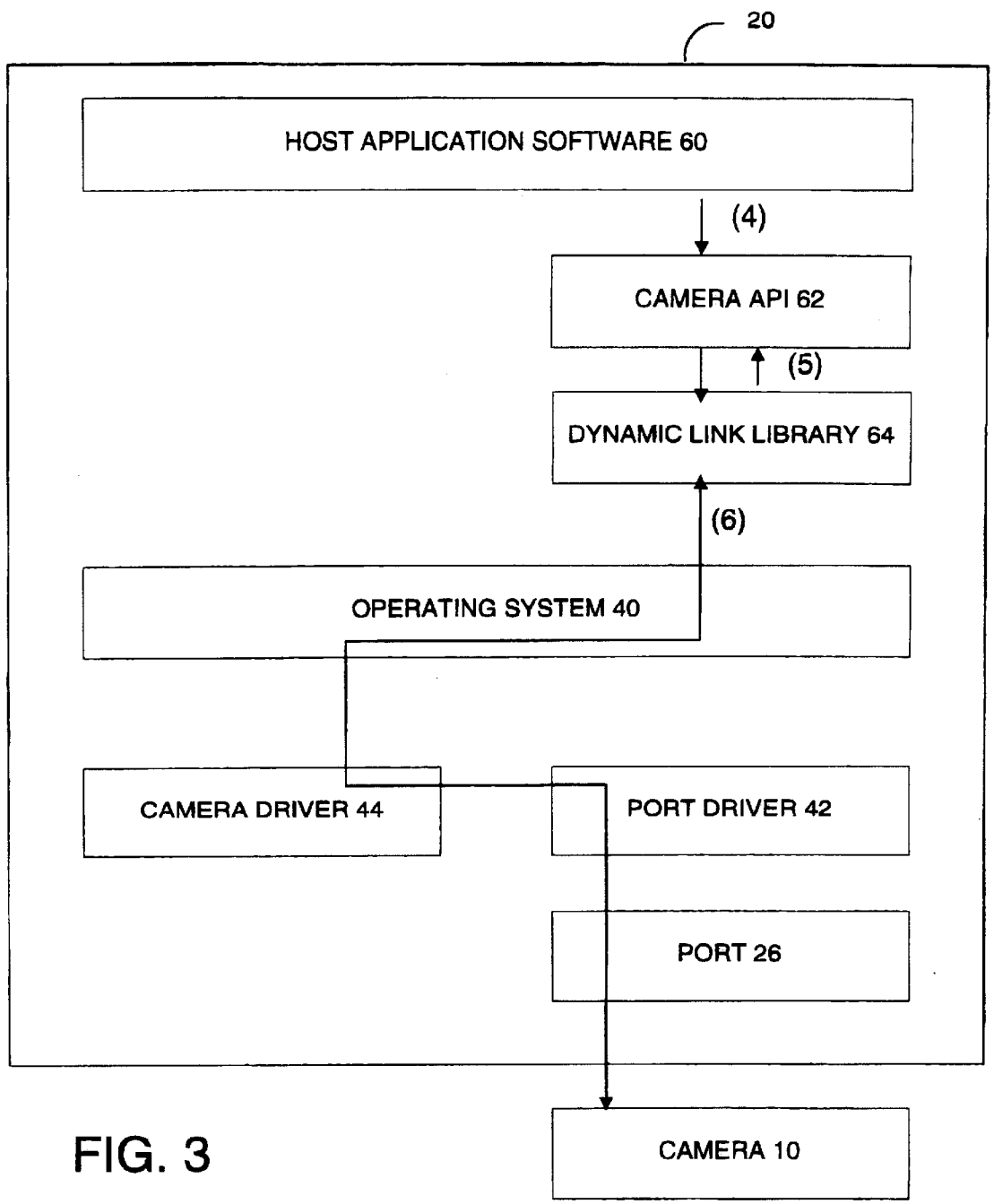
FIG. 3 shows one embodiment of the flow of information among the components of the host system after the host application software 60 has been initiated.

FIGS. 2 and 3 are embodiments showing the relationship and messaging between components of the host system 20 and imaging device (camera) 10. FIG. 2 shows one embodiment of the flow of information among the components of the host system when the imaging device 10 is first connected to the host system 20. The host system 20 includes an operating system (O/S) 40 and host application software 60. The host system 20 detects when an imaging device such as a camera 10 is attached to the host system 20. In one embodiment, the operating system 40 detects whether a camera 10 is attached to the system by polling the port 26. A port driver 42 may be used to provide an interface between the operating system 40 and the port 26. In one embodiment, the port 26 is a USB port and the port driver is a USB driver.

The operating system may be one of a variety of different operating systems. In one embodiment, the operating system is a Windows* operating system, such as Windows* 95, or Windows* 98 made by Microsoft Corporation. Windows 98 includes books which allow the polling of ports. Other operating systems may be modified to provide for such polling. The polling is preferably performed in the background so that the user need not be aware that it is being performed. Alternatively, host application software 60 can perform the polling of the port 26. However, polling by the operating system 40 (instead of by host application software 60) has a performance advantage, since the operating system is already set up for polling various activities, such as keyboard pushes, mouse movements, and so forth. For the purposes of illustration, the following description assumes that the operating system does the polling. A person skilled in the art can make the modifications to allow an application to do the polling.

* Third-party marks and brands are the property of their respective owners.

When a camera 10 is connected to the port 26 of the host system 20, the port driver 42 signals the operating system 40 that the camera has been attached to the host system 20. This is illustrated by the arrow marked (1) shown in FIG. 1. The operating system 40 identifies the device as a camera and loads the corresponding software driver 44 into memory as illustrated by the arrow (2). In one embodiment, the operating system 40 interrogates the camera 10 to get an identifier. The operating system 40 loads the software driver 44 corresponding to the identifier. In this example, a camera driver 44 is loaded by the operating system 40.

The operating system 40 then loads one or more software applications corresponding to the camera. In one embodiment, the operating system allows software applications to be registered. Upon meeting a predetermined condition (such as a camera with a particular identifier being detected), the registered host software application is loaded. In this case, the host application software 60 (for the camera) is loaded as shown by the arrow (3). In one embodiment, the camera driver 44 signals the operating system 40 to initiate the host application software 60. The host application software 60 initiates the transfer of image information between the image device (camera) 10 and the host system 20. The host application software 60 may also process images. For example, the host application software 60 can perform decompression and/or color correction on the images. Furthermore, the host application software 60 may perform rotation, cropping, and other image manipulation functions.

Some operating systems, such as Windows 98 allow specific events to cause software applications to be launched. For example, the camera driver 44 can be set up with registered events such as "connection detected with camera" or "shutter button on camera is pushed." Thus, an operating system can be set up to automatically launch an application such as the host application software 60 when tee camera 10 is attached.

In one embodiment, if the camera driver 44 or the host application software 60 is not installed on the host system 20 when the camera 10 is attached to the host system 20, then the user is requested to provide the camera driver 44 and/or host application software 60 for the device that has been attached to the port 26. Once the installation has been completed, the process proceeds as previously described.

FIG. 3 shows one embodiment of the flow of information among the components of the host system after the host application software 60 has been initiated. In this embodiment, after being loaded, the host application software 60 creates and initializes a camera Applications Programming Interface (API) 62 as indicated by arrow (4). The camera API 62 may perform its task in a background thread. In this manner, the host application software 60 need not wait for the camera API 62 to complete before performing other tasks. In one embodiment, the camera API 62 is a COM object which loads an O/S-dependent dynamic link library (DLL) 64 as shown by arrows (5). The camera API 62 communicates to the operating system 40 via the DLL 64. (In another embodiment, the camera API 62 incorporates the DLL 64.) The operating system 40 in turn communicates with the camera 10 via the camera driver 44 and the port driver 42 as shown by arrows (6).

FIG. 4 shows one embodiment of the polling initialization process. The polling initialization process begins with the operating system opening the host application software. The host application software 60 then creates and initializes a camera API 62. In one embodiment, the host application software 60 adds itself to the camera API's callback list, so that the host application software 60 will be notified when the camera API is successful in the polling process.

In one embodiment, the camera API upon initialization resets its internal variables, loads an O/S dependent DLL, and creates and starts a background thread. The camera API then inserts a message into the background threaded queue that ties to open the camera driver. (A driver is "opened" by establishing a connection with the driver.) In one embodiment, the camera driver is only opened when a camera is attached: If the camera driver cannot be opened, then a camera is not attached to the host system. If a camera driver can be opened, then a camera is attached. In one embodiment, the camera API 44 attempts to open the camera driver every half a second.

FIG. 5 shows an embodiment of the polling process between the camera API 62 and the host application software 60. In this embodiment, the camera API 62 attempts to open the camera driver. When it is successful at opening the camera driver, the camera API closes the camera driver, and notifies the applications in its callback queue. Since the host application software 60 is in the callback queue of the camera API, it is notified that a camera has been detected.

In this embodiment, the host application software 60 re-opens the camera driver 44 by signaling the camera API 62 to open the camera driver 44 and check for a compatible camera. The host application software 60 can then send various commands to the camera 10 via the camera API 44 (and the operating system 40 and drivers 44 and 42). For example, the host application software 60 can request the number of images stored in the camera. The host application software 60 can request a list of the names of the images and the image sizes, or it can request a particular image.

Figure 6:
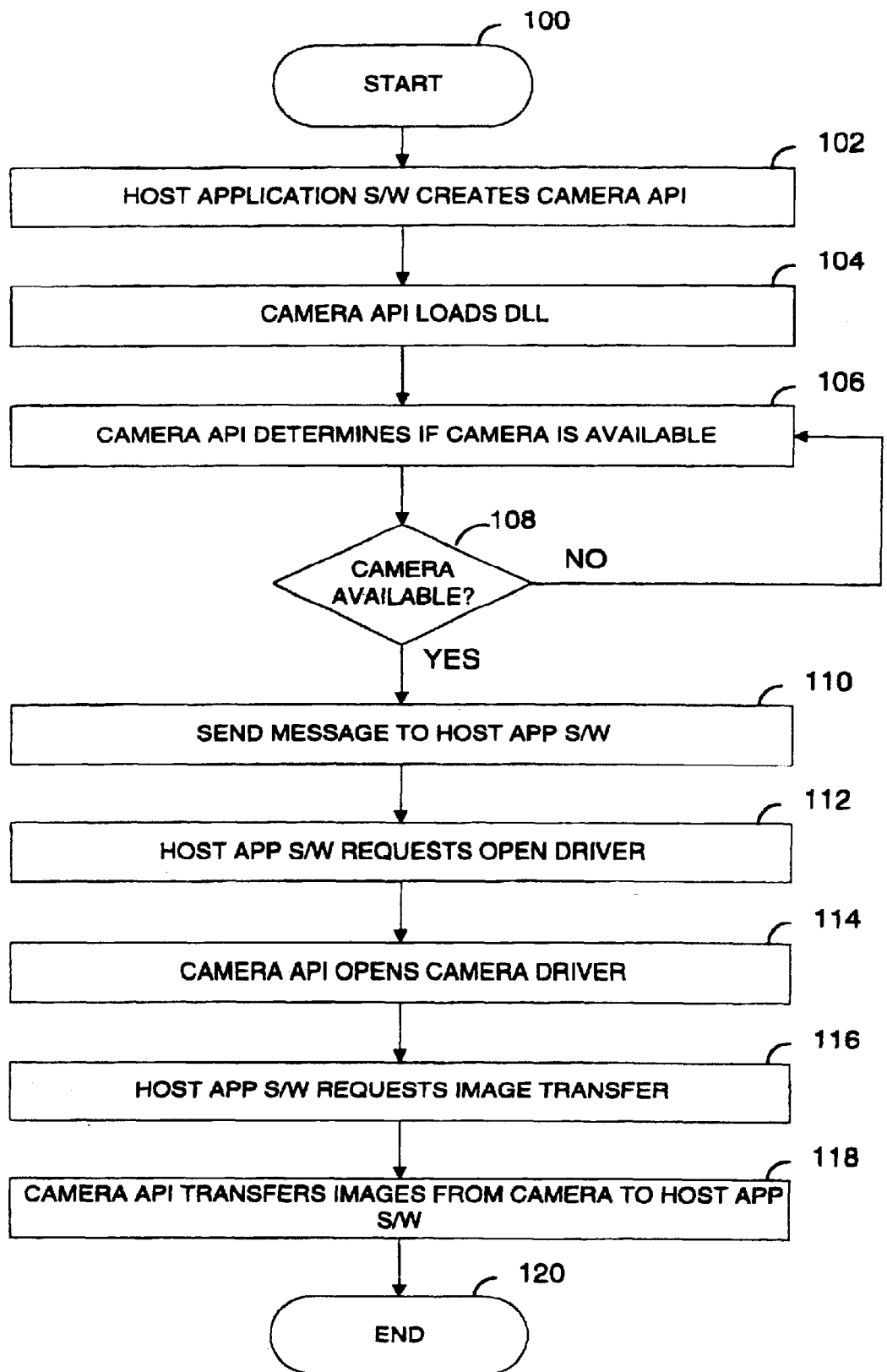
FIG. 6 shows a flowchart of one embodiment of the process of transferring images between the imaging device and host system.

FIG. 6 shows a flowchart of one embodiment of the process of transferring images between the imaging device and host system. In this case, the imaging device is a camera, and the host system is a personal computer. The flowchart begins at block 100. The process continues at block 102, at which the host application software creates a camera API. The camera API loads a DLL that is operating system dependent at block 104. At block 106, the camera API determines if a camera is available.

At block 108, if a camera is not available, then the flowchart returns to block 106. However, if a camera is available, the process continues at block 110. At block 110, the camera API sends a message to the host application software indicating that a camera is available. The host application software requests that the camera driver be open at block 112. The camera API responds by opening the camera driver, as shown at block 114. The process of opening a driver means establishing a connection with the camera driver. At block 116, the host application software requests that images are transferred from the camera to the host system. The camera API responds by transferring image information from the camera to the host application software at block 118. Image information may include image pixel data as well as other information, such as color palette information, compression information, orientation of the image, and so forth. The flowchart terminates at block 120.

Figure 7:
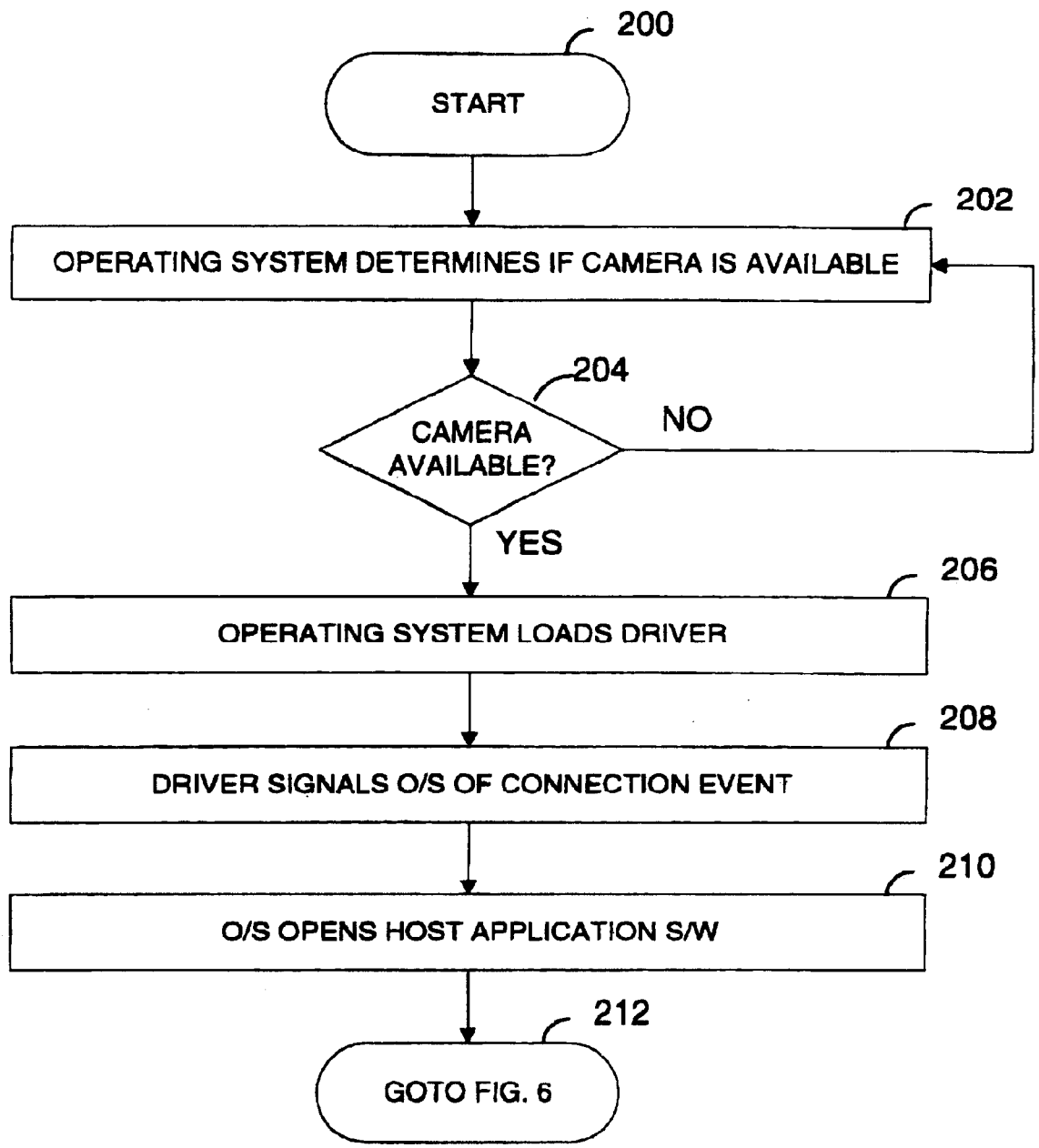
FIG. 7 shows a flowchart of one embodiment of the process of detecting that an imaging device such as a camera is attached to a host system.

FIG. 7 shows a flowchart of one embodiment of the process of detecting that an imaging device such as a camera is attached to a host system. The flowchart starts at block 200. It continues at block 202, in which the operating system determines if a camera is available. This may be done with the aid of a port driver such as a USB driver. If the camera is not available, the process returns to block 202. If a camera is available at block 204, the process continues at block 206 at which the operating system loads the camera driver.

In one embodiment, an operating system such as Windows 98 is used. Windows 98 allows the driver to signal the operating system of the camera being connected to the host system (the connection event), as shown by block 208. The operating system then opens the applications that are registered with the connection event. In this case, the host application software for the camera is initiated, as shown at block 210. The flowchart then continues with the flowchart of FIG. 6.

If the operating system does not provide a way of opening an application based on the connection event, an alternate embodiment may use a "service" instead of the steps shown by blocks 208 and 210. The service is installed by the user and is initiated on the host system automatically when the host system boots up. The service opens the host application software when a camera is detected. In one embodiment, the service uses the camera API to determine if the camera is available. Thus, the service acts as a mini-host application in a manner similar to that shown in FIG. 6. However, the service initiates the host application software when a connection to the camera driver is established. The host application then establishes its own connection to the camera driver to transfer images from the camera In one embodiment, the host application software 60 and the camera driver 44 are shipped with the camera 10. The host application software 60 and camera driver 44 may be shipped via floppy disk or CD-ROM. Alternatively, the host application software 60 and camera driver 44 can be downloaded via the World Wide Web. The host application software 60 and camera driver 44 are installed to a storage medium on the host system, such as a hard disk, dynamic random access memory (DRAM), static random access memory (SRAM), or flash memory.

In the foregoing specification, the invention has been described with reference to specific exemplary embodiments thereof. It will, however be evident to someone having the benefit of this disclosure, that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system comprising:
   a processor;
   a storage medium storing instructions which if executed by the processor cause the processor to perform an operation including:
   creating and initializing an imaging device Applications Programming Interface (API);
   the API periodically attempting to open an imaging device driver on a host system to communicate image information with the imaging device and wherein the imaging device driver is opened if the imaging device is connected with the host system; and
   subsequent to the API successfully opening the imaging device driver, transferring image information from the imaging device to the host system.

2. A computer-readable medium having stored thereon a plurality of instructions which, when executed by a processor, cause the processor to perform an operation including:
   creating and utilizing an imaging device Application Programming Interface (API);
   the API periodically attempting to open an imaging device driver on a host system to communicate image information with the imaging device and wherein the imaging device driver is opened if the imaging device is connected with the host system; and
   subsequent to the API successfully opening the imaging device driver, transferring image information from the imaging device to the host system.

3. A method of transferring image information from an imaging device to a computer, the method comprising:
   detecting if the imaging device is connected to the computer;
   loading an imaging device driver onto the computer if the imaging device is detected to be connected to the computer;
   signaling an operating system, executing on the computer, that the imaging device is connected to the computer; and
   transferring the image information from the imaging device to the computer using the imaging device driver upon the operating system being signaled that the imaging device is connected to the computer.

4. The method of claim 3, wherein transferring the image information further comprises:
   initiating an application program for transferring the image information from the imaging device to the computer.

5. A method of transferring image information between an imaging device and a host system, the method comprising:
   application software, executing on the host system, creating and initializing an imaging device Applications Programming Interface (API);
   the API periodically attempting to open an imaging device driver on the host system to communicate image information with the imaging device and wherein the imaging device driver is opened if the imaging device is connected with the host system; and
   subsequent to the API successfully opening of the imaging device driver, transferring the image information from the imaging device to the host system.

6. The method of claim 5, further comprising:
   detecting a successful opening of the imaging device driver if the imaging device is connected to the host system; and
   the API notifying the application software the imagining device has been detected if the imaging device is connected to the host system.

7. The method of claim 6, further comprising:
   after successful opening of the imaging device driver and prior to the API notifying the application software the imaging device is detected, the API closing the imaging device driver;
   said API rejecting and notifying the application software that the imaging device is no longer being used; and
   upon said notification the application software re-opening the imaging device driver by signaling the API.

8. The method of claim 6 wherein the imaging device is detected if the imaging device is connected to a port of the host system.

9. The method of claim 8, further comprising:
   a port driver signaling if the imaging device is connected to the host system, wherein the imaging device driver is successfully opened subsequent to the signaling of the port driver.

10. A method of transferring image information between an imaging device and a host system, the method comprising:
    application software, executing on the host system, creating and initializing an imaging device Applications Programing Interface (API);
    the API periodically attempting to open an imaging device driver on the host system to communicate image information with the imaging device and wherein the imaging device driver is opened if the imaging device is connected with the host system;

subsequent to the API successful opening of the imaging device driver, transferring the image information from the imaging device to the host system;

detecting a successful opening of the imaging device driver once a connection of the imaging device is detected;

the API notifying the application software the imaging device has been detected;

after successful opening of an imaging device driver and prior to the API notifying the application software the imaging device has been detected, the API closing the imaging device driver;

said API rejecting and notifying the application software that the imaging device is closed; and upon said notification the application software re-opening the imaging device driver by signaling the API.

* * * * *